US012762159B1

(12) United States Patent
Samuel et al.

(10) Patent No.: US 12,762,159 B1
(45) Date of Patent: Oct. 13, 2026

(54) ATTRIBUTE-BASED CLUSTERED ENTITY RETRIEVAL

(71) Applicant: Intuit Inc., Mountain View, CA (US)

(72) Inventors: John Samuel, Bangalore (IN); Vishal Kumar Singh, Bangalore (IN); Shruthi Attiganal, Bangalore (IN); Chithritha V M V, Bangalore (IN)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 19/241,187

(22) Filed: Jun. 17, 2025

(51) Int. Cl.
*G06F 16/00* (2019.01)
*G06F 9/48* (2006.01)
*G06F 16/28* (2019.01)

(52) U.S. Cl.
CPC .......... *G06F 16/285* (2019.01); *G06F 9/4881* (2013.01)

(58) Field of Classification Search
CPC .................................................... G06F 16/285
USPC ........................................................ 707/737
See application file for complete search history.

(56) References Cited

U.S. PATENT DOCUMENTS 12,363,530 B1 * 7/2025 Rathnam ............... H04W 12/06 707/707
12,413,957 B1 * 9/2025 Rathnam ............. H04W 64/006 707/707
12,501,456 B1 * 12/2025 Rathnam ............... H04W 72/40 707/707
2022/0019593 A1 * 1/2022 Sheerin .................. G06F 40/30 707/707
2022/0414126 A1 * 12/2022 Mahindru ........... G06F 16/3329 707/707

OTHER PUBLICATIONS

Alam., "Decoding the Mystery: How Upwork's Algorithm Shapes Our Freelance Journeys", Linkedin, Aug. 17, 2024, 8 Pages.

* cited by examiner

*Primary Examiner* — Alexandria Y Bromell
(74) *Attorney, Agent, or Firm* — Dinsmore & Shohl LLP

(57) ABSTRACT

Certain aspects of the disclosure provide an entity matching system and corresponding method. The method includes generating a plurality of assistant clusters by clustering a plurality of assistant profiles based on one or more assistant attributes associated with each assistant profile of the plurality of assistant profiles; identifying a target cluster of the plurality of assistant clusters that corresponds to a target user profile based on one or more user attributes of the target user profile and one or more cluster attributes of the target cluster; generating a ranking of one or more assistant profiles associated with the target cluster; identifying a target assistant profile that corresponds to the target user profile; and generating a recommendation to match the target assistant profile to the task indicated in the request.

24 Claims, 6 Drawing Sheets

ATTRIBUTE-BASED CLUSTERED ENTITY RETRIEVAL

BACKGROUND

Field

Aspects of the present disclosure relate to entity matching systems.

Description of Related Art

Entity matching systems have become fundamental components of modern digital platforms, servicing various technological domains, such as online marketplaces, professional networking platforms, ride-sharing services, dating applications, job placement systems, and collaborative platforms. These systems are designed to identify and pair entities belonging to different classifications based on different criteria. For example, in a ride-sharing platform, the system is configured to match drivers with passengers. In professional networking environments, the entity matching systems are configured to match job seekers with potential employers. In service provider platforms, the entity matching systems are configured to match service providers with clients needing specific services. Given their widespread application across diverse technological domains, entity matching systems represent an important infrastructure component that supports user resource allocation and relationship formation in modern digital ecosystems.

SUMMARY

Certain aspects provide a method for generating a recommendation. The method includes generating a plurality of assistant clusters by clustering a plurality of assistant profiles based on one or more assistant attributes associated with each assistant profile of the plurality of assistant profiles; receiving a request associated with a target user profile, the request indicating a task to be matched with an assistant profile of the plurality of assistant profiles; identifying a target cluster of the plurality of assistant clusters that corresponds to the target user profile based on one or more user attributes of the target user profile and one or more cluster attributes of the target cluster; generating a ranking of one or more assistant profiles associated with the target cluster based on the one or more user attributes of the target user profile and the one or more assistant attributes associated with each assistant profile of the one or more assistant profiles associated with the target cluster; identifying a target assistant profile that corresponds to the target user profile based on the ranking of the one or more assistant profiles; and generating a recommendation to match the target assistant profile to the task indicated in the request.

Other aspects provide processing systems configured to perform the aforementioned methods as well as those described herein; non-transitory, computer-readable media comprising instructions that, when executed by a processor of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
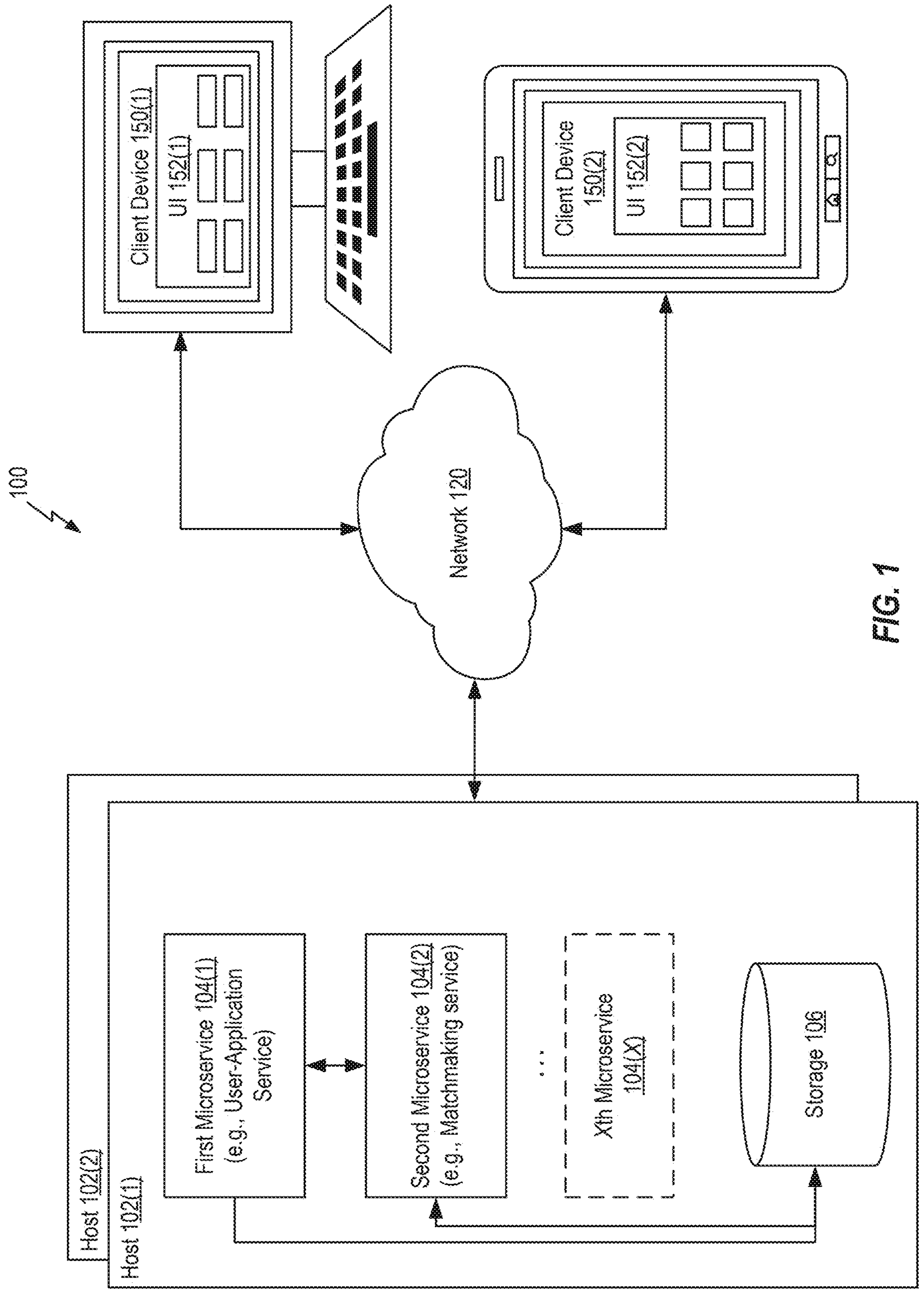
FIG. 1 depicts an example computing environment implementing an example matchmaking service.

Existing entity matching systems employ one or more techniques, such as distance-based matching algorithms, graph-based matching algorithms, machine learning-based matching algorithms, and collaborative filtering algorithms. As one example, distance-based matching algorithms, like Euclidean distance, Manhattan distance, or Cosine similarity, calculate mathematical distances between entity vector representations to determine compatibility scores. As another example, graph-based matching algorithms attempt to solve the matching optimization problem associated with entity matching systems by modeling entities as nodes in a graph structure and seeking optimal edge assignments that maximize overall matching utility between entities. However, existing entity matching systems suffer from several technical problems.

For example, while computationally straightforward, the matching accuracy of distance-based algorithms degrades as the number of features increases. Graph-based algorithms are computationally intensive and incur large time latencies, making them impractical for large-scale systems with thousands of entities and/or systems that need to deliver real-time responses.

Other technical problems associated with existing entity matching techniques, like the aforementioned distance-based and graph-based matching algorithms, include the inability to dynamically adapt to changing entity preferences, availability, or other system conditions. In particular, existing algorithms may rely on static models or parameters that can become outdated as user behavior changes, leading to decreased matching relevance over time. Another technical problem arises with resource utilization when matching algorithms consumer excessive computational resources, memory, or network bandwidth, particularly during peak usage periods. These inefficiencies can lead to system bottlenecks, increased operational costs, and overall degraded user experience.

These and other technical problems create a compelling need for improved entity matching systems that can provide accurate, scalable, and efficient matching capabilities, while maintaining adaptability in dynamic, multi-entity environments. Accordingly, the present disclosure describes entity matching systems and corresponding methods that improve upon the state-of-the-art and provide technical solutions to the aforementioned technical problems associated with existing entity matching systems. In some aspects, the present disclosure is directed to entity matching systems that match users to assistants who are able to help the users with various tasks. However, such matching systems as disclosed herein can be used for many additional practical applications.

Embodiments of entity matching systems described herein may be configured to cluster user profiles based on shared user profile attributes and cluster assistant profiles based on shared assistant profile attributes. At least one user profile is identified as the target user profile, for which the entity matching systems will rank and match one or more assistant profiles. The entity matching systems analyze the attributes of the target user profile and attributes of one or more assistant clusters to identify a target assistant cluster. The entity matching systems then compare the target user profile with each assistant profile in the target assistant cluster to determine a matching score for each potential assistant-user pair. Based on the determined matching scores for the potential assistant-user pairs, the entity matching systems are configured to generate a ranking of assistants and recommend one or more assistants to be matched with the target user profile. In some aspects, the entity matching systems utilize a natural language processing (NLP) module to perform clustering and a machine learning (ML) module to perform ranking and matching.

The user associated with the target user profile is then able to select a recommended assistant to help the user complete one or more tasks. Once the task is completed, the entity matching system is configured to prompt the user to provide user input indicating a client satisfaction regarding the assistant and completed task. The entity matching system determines additional feedback about the assistant and the completed task, including an accuracy score and a completion time for the completed task. This feedback is then used to update the NLP module and ML module to improve the clustering, ranking, and matching of the different profiles. The feedback is also used to update the assistant profiles, including performance metrics of the assistant, such as average completion time, client satisfaction, and overall accuracy of past completed tasks.

Based on updating the NLP module, the ML module, and the assistant profiles, the entity matching systems described herein are able to improve assistant recommendations over time and adapt to dynamically changing attributes of the users and assistants. In this manner, the entity matching systems are able to stay up-to-date with the capabilities of assistants and preferences of users. As another technical solution, the entity matching systems herein overcome the problem of degraded user matches with increasing entity features because the entity matching systems are able to analyze many different attributes associated with the user profiles and target assistant profiles.

The entity matching systems described herein also help mitigate and solve the problem associated with resource utilization by first clustering the user profiles and assistant profiles. By identifying a target assistant cluster, the entity matching systems are able to narrow down the number of matches that will be analyzed to the number of assistants in the target assistant cluster. This saves on computational resources, such as compute and memory. By performing the entity matching in the manner and reducing the number of assistant profiles to analyze, the entity matching systems also beneficially reduce latency in response times for providing recommendations to users, thereby overcoming technical problems associated with computationally expensive matching algorithms like graph-based matching algorithms.

While the following disclosure refers to one practical application of matching assistants and users for tasks related to tax regulations and tax return filings, the entity matching systems and corresponding methods described herein may be used to match entities in any multi-entity environment.

Example System Implementing a Matchmaking Service in a Communication Service

FIG. 1 depicts an example system 100 supporting a plurality of the microservices 104 (e.g., software-defined services, which in some cases, may be cloud-native). As shown in FIG. 1, system 100 includes client devices 150 (1)-(2) (collectively referred to herein as "client devices 150") and hosts 102(1)-(2) (collectively referred to herein as "hosts 102") interconnected through a network 120. Network 120 may be, for example, a direct link, a local area network (LAN), a wide area network (WAN), such as the Internet, another type of network, or a combination of one or more of these networks.

Hosts 102 may be geographically co-located servers on the same rack or on different racks in any arbitrary location in a data center. Hosts 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1) and/or another of the microservices 104, through the X-th microservice 104(X) using the network 120. For example, communication between client devices 150 and at least one of the microservices 104 may be facilitated by one or more application programming interfaces (APIs). Examples of client devices 150 may include a smartphone, a personal computer, a tablet, a laptop computer, and/or other devices.

As shown in FIG. 1, in certain aspects, the first microservice 104(1) implements a user-application service, which is any network 120 accessible service that maintains user accounts associated with one or more software platforms. In some aspects, the user-application service provides document filing services, such as tax filing services, for users. In certain aspects, the user-application service stores its data in storage 106.

In certain aspects, the second microservice 104(2) implements a matchmaking service. The matchmaking service may be a service used to identify compatible assistants for a target user associated with the communication service. For example, in certain aspects, the matchmaking service may use one or more techniques (e.g., such as techniques for clustering and ranking, described herein) to match one or more assistants as matches for the target user. A respective assistant is compatible with a target user when the attributes, such as an area of expertise, of the assistant match the expertise needed to complete a task, such as filing a tax return, requested by the target user. For example, an assistant may be compatible with filing a federal tax return when the assistant has expertise with federal tax regulations. As another example, in certain aspects, the matchmaking service may use one or more techniques to rank different assistants to identify one or more compatible assistants for the target user. For example, some assistants may be more compatible with the target user than other assistants. For example, if a target user needs to file a federal tax return and a NY state tax return, an assistant with federal and state tax regulation expertise will be more compatible than an assistant with only federal tax regulation expertise.

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two of the hosts 102 and two of the client devices 150, other examples may include more or fewer of the hosts 102 and/or client devices 150, and client devices 150 may use any combination of microservices 104 on any of hosts 102 where microservices 104 are deployed.

Figure 2:
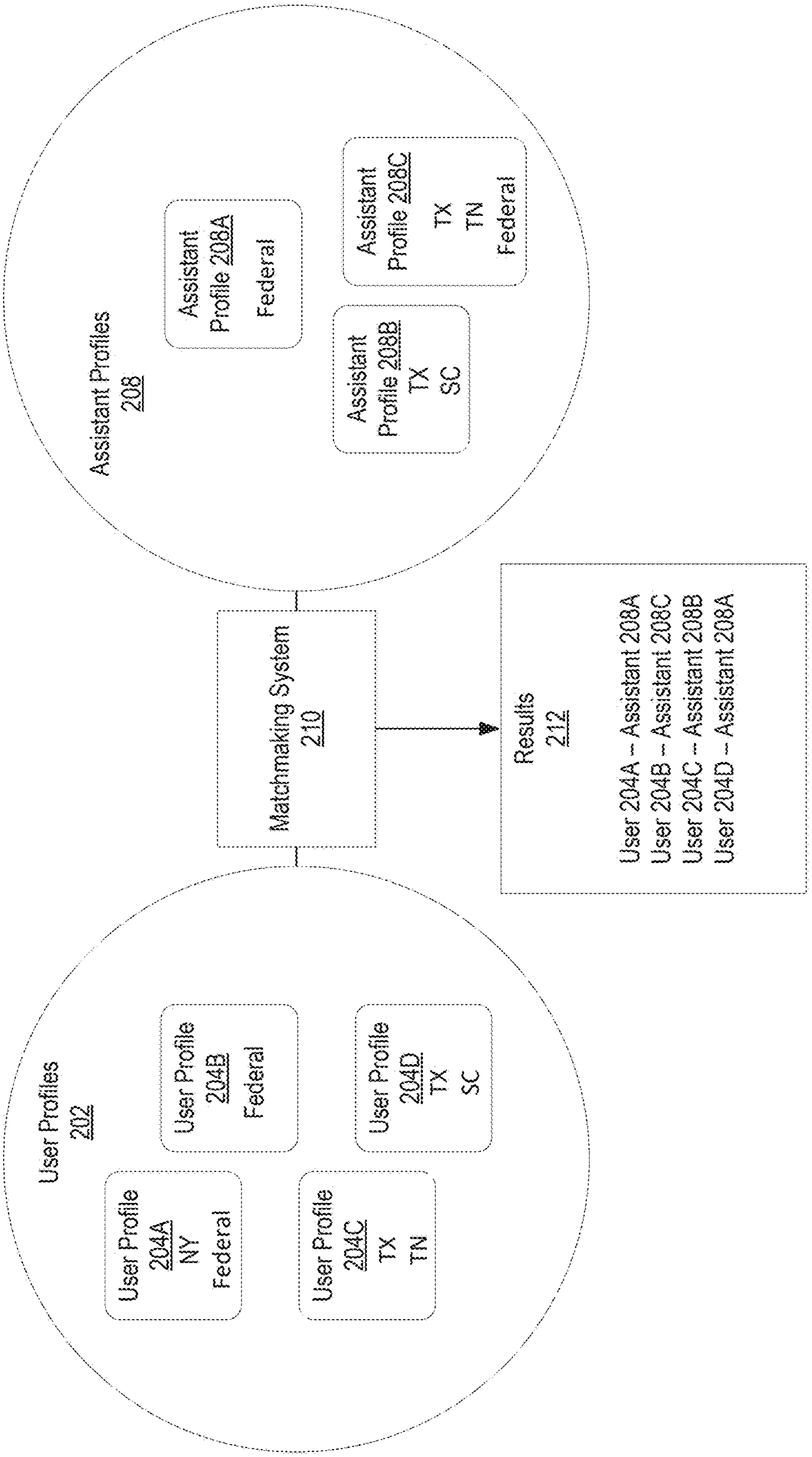
FIG. 2 depicts a flow diagram for matching assistant profiles and user profiles.

FIG. 2 depicts a flow diagram for matching assistant profiles and user profiles. In particular, matchmaking system 210 is configured to receive inputs, including user profiles 202 and assistant profiles 208, and generate results 212 based on matching the user profiles and assistant profiles. In some aspects, the user profiles and assistant profiles are configured as JSON files. As depicted in FIG. 2, user profiles 202 include a plurality of user profiles, such as user profile 204A, user profile 204B, user profile 204C, and user profile 204D. While four user profiles are shown, user profiles 202 may include any number of user profiles. Each user profile includes attributes about one or more tasks that the user corresponding to a respective user profile would like an assistant to help with. In some aspects, the tasks include filing one or more tax returns. Accordingly, user profile 204A includes attributes indicating a "NY" state tax return and a "Federal" tax return. User profile 204B includes attributes indicating a "Federal" tax return. User profile 204C includes attributes that indicate a "TX" state tax return and a "TN" state tax return. User profile 204D includes attributes that indicate a "TX" state tax return and a "SC" state tax return.

Assistant profiles 208 include a plurality of assistant profiles, such as assistant profile 208A, assistant profile 208B, and assistant profile 208C. While assistant profiles 208 includes three assistant profiles, assistant profiles 208 may include any number of assistant profiles. Each assistant profile includes attributes relating to an area of expertise of the assistant corresponding to a respective assistant profile. For example, assistant profile 208A includes attributes indicating a "Federal" tax return expertise. Assistant profile 208B includes attributes indicating a "TX" state tax return expertise and a "SC" state tax return expertise. Assistant profile 208C includes attributes indicating a "TX" state tax return expertise, "TN" state tax return expertise, and "Federal" tax return expertise.

Matchmaking system 210 is configured to analyze a user profile, such as user profile 204A, and each assistant profile of assistant profiles 208 to predict a "best match" for matching an assistant profile to the user profile. In some aspects, matchmaking system 210 is configured to analyze each user profile and each assistant profile in order to determine a "best match" for each user profile of user profiles 202. For example, in some aspects, matchmaking system 210 generates results 212, which includes a plurality of matched profiles of user profiles and assistant profiles. As depicted in FIG. 2, matchmaking system 210 determined that user profile 204A matches assistant profile 208A, user profile 204B matches assistant profile 208C, user profile 204C matches assistant profile 208B, and user profile 204D matches assistant profile 208A.

Figure 3:
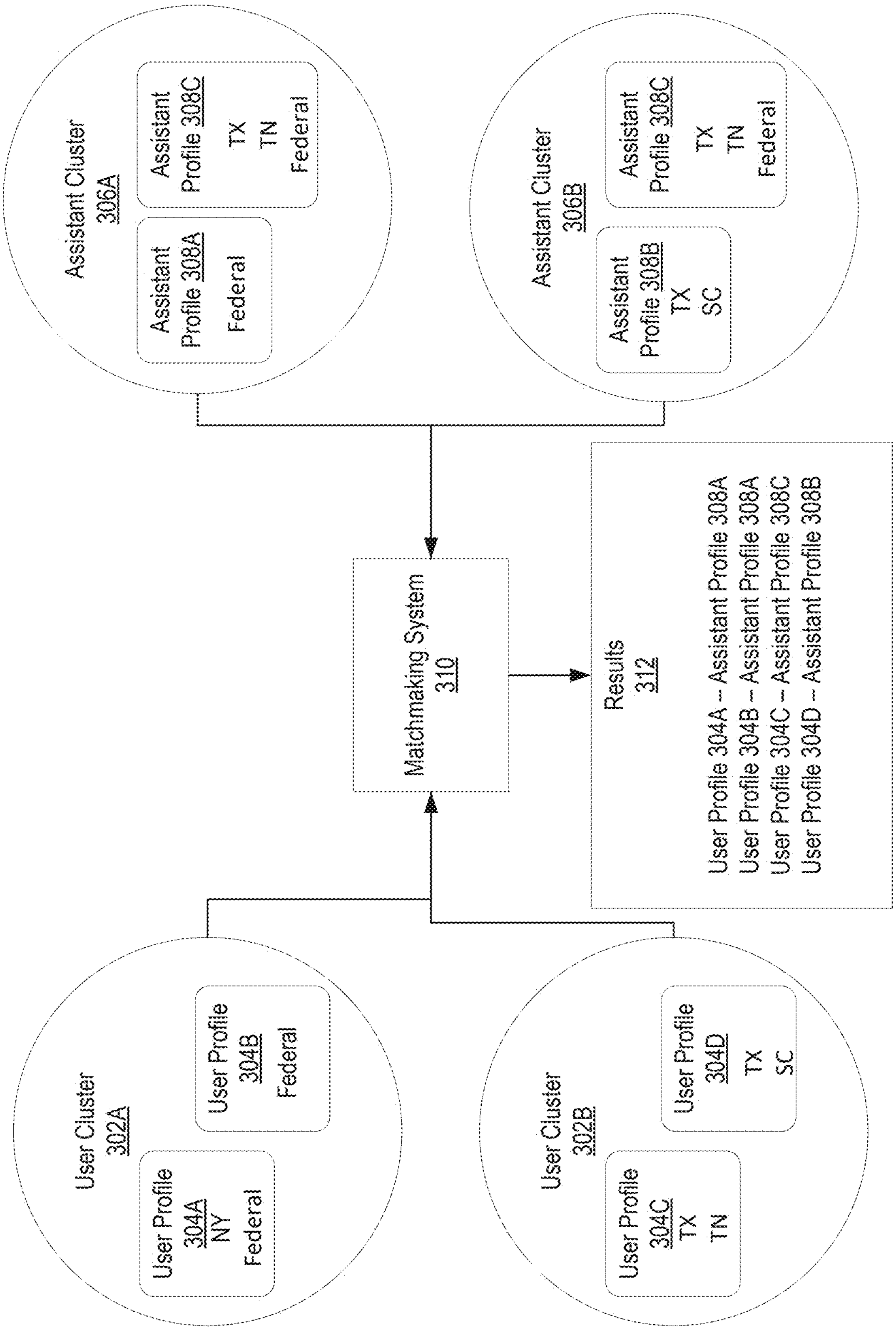
FIG. 3 depicts a flow diagram for clustering and matching assistant profiles and user profiles.

FIG. 3 depicts a flow diagram for clustering and matching assistant profiles and user profiles. In some aspects, matchmaking system 310 is configured to cluster user profiles and assistant profiles before generating matched results. User profiles are clustered based on one or more shared user profile attributes. Assistant profiles are clustered based on one or more shared assistant profile attributes. As shown in FIG. 3, matchmaking system 310 generates user cluster 302A and user cluster 302B. User cluster 302A includes the user profile 304A and the user profile 304B. User cluster 302A has been generated based on clustering user profiles that include at least one attribute indicating a "Federal" tax return. For example, user profile 304A includes attributes indicating "NY" state tax return and "Federal" tax return, and user profile 304B includes an attribute indicating a "Federal" tax return.

User cluster 302B includes user profile 304C and user profile 304D. User profile 304C includes attributes that indicate a "TX" state tax return and a "TN" state tax return, and user profile 304D includes attributes that indicate a "TX" state tax return and a "SC" state tax return. Thus, user cluster 302B includes user profiles that have a shared profile attribute of "TX" state tax returns.

In addition to user clusters, matchmaking system 310 is also configured to generate assistant clusters, such as assistant cluster 306A and assistant cluster 306B. As illustrated in FIG. 3, assistant cluster 306A includes assistant profile 308A and assistant profile 308C. Assistant profile 308A includes an attribute that indicates a "Federal" tax return filing expertise. Assistant profile 308C includes attributes that indicate a "TX" state filing expertise, "TN" state filing expertise, and "Federal" filing expertise.

Assistant cluster 306B includes assistant profile 308B and assistant profile 308C. Assistant profile 308B includes attributes that indicate a "TX" state filing expertise and a "SC" state filing expertise. In some aspects, as shown in FIG. 3, an assistant profile, such as assistant profile 308C, can be included in multiple assistant clusters based on sharing attributes with other assistant profiles in the assistant cluster. For example, assistant cluster 306A includes assistant profiles that include an attribute that indicates a "Federal" tax return filing expertise. Assistant cluster 306B includes assistant profiles that include an attribute that indicates a "TX" state filing expertise. Thus, because assistant profile 308C includes both a "Federal" tax return filing expertise and a "TX" state filing expertise, assistant profile 308C is included in both assistant cluster 306A and assistant cluster 306B.

After clustering the user profiles and the assistant profiles, matchmaking system 310 is configured to generate results 312, which includes a plurality of matched pairs including a user profile and an assistant profile in each pair. For example, results 312 includes a first matched pair including user profile 304A and assistant profile 308A, a second matched pair including user profile 304B and assistant profile 308A, a third matched pair including user profile 304C and assistant profile 308C, and a fourth matched pair including user profile 304D and assistant profile 308B.

In some aspects, matchmaking system 310 is configured to generate results 312 by receiving a request associated with a target user profile, such as user profile 304A. The request indicates a task to be matched with an assistant profile. Matchmaking system 310 identifies one or more user profile attributes included in the target user profile, such as "NY" state tax return and "Federal" tax return included in user profile 304A. Based on the identified user profile attributes, matchmaking system 310 identifies a target assistant cluster, from among the available assistant clusters, that best matches the user profile attributes of the target user profile. In this example, the available assistant clusters include assistant cluster 306A associated with "Federal" tax return expertise and assistant cluster 306B associated with "TX" state tax return expertise. Thus, matchmaking system 310 may determine that assistant cluster 306A matches user profile 304A based on sharing an attribute associated with "Federal" tax return filing.

After identifying the assistant cluster that matches the target user profile, matchmaking system 310 is configured to identify one or more assistant profiles included in the identified assistant cluster that match the target user profile. In some aspects, matchmaking system 310 is configured to generate a ranking of one or more assistant profiles associated with the target assistant cluster that corresponds to the target user profile based on one or more attributes of the target user profile and one or more cluster attributes of the target assistant cluster and corresponding assistant profiles. As one example, for user profile 304A as the target user profile, matchmaking system 310 may determine that both assistant profile 308A and assistant profile 30C of the target assistant cluster (assistant cluster 306A) may correspond to user profile 304A.

Matchmaking system 310 may then rank assistant profile 308C according to a first ranking and assistant profile 308A according to a second ranking, with respect to user profile 304A. Matchmaking system 310 may rank assistant profile 308C higher than assistant profile 308A because, although assistant profile 308C does not include a "NY" state filing expertise, it does include other state filing expertise, while assistant profile 308A only includes an attribute indicating "Federal" tax return expertise. This combination of attributes of assistant profile 308C is relevant because user profile 304A includes attributes for both state filing (e.g., "NY") and federal filing.

Matchmaking system 310 then identifies a target assistant profile that corresponds to the target user profile based on the ranking of the assistant profiles. Thus, in some aspects, matchmaking system 310 may identify assistant profile 308C as the target assistant profile based on assistant profile 308C having a first ranking of the assistant profiles included in assistant cluster 306A. Accordingly, matchmaking system 310 will then generate a recommendation to match the target assistant profile to the task indicated in the request.

In some aspects, matchmaking system 310 is configured to identify a target user cluster and match each user profile in the target user cluster to an assistant profile. In particular, matchmaking system 310 may identify the target user cluster and then identify a target assistant cluster that matches the target user cluster. As one example, matchmaking system 310 may identify user cluster 302A as the target user cluster and identify assistant cluster 306A as the matching target assistant cluster based on user cluster 302A being associated with "Federal" tax return filings and assistant cluster 306A being associated with "Federal" tax return expertise. Matchmaking system 310 will then identify a match for each of user profile 304A and user profile 304B.

While both assistant profile 308A and assistant profile 308C include attributes that indicate a "Federal" tax filing expertise, matchmaking system 310 may determine that assistant profile 308A is a better match for user profile 304B because both profiles include a single attribute that is associated with "Federal" filing. Matchmaking system 310 may determine that assistant profile 308C is a better match for user profile 304A because, although assistant profile 308C does not include a corresponding attribute for "NY" state filings, it does include other state filing expertise in addition to "Federal" filing expertise, which better matches user profile 304A which includes attributes for both federal and state tax filings.

In some aspects, matchmaking system 310 generates results 312, which include an assistant profile matched to all user profiles of all user clusters. For example, as illustrated in FIG. 3, user profile 304A is matched with assistant profile 308A, user profile 304B is matched with assistant profile 308A, user profile 304C is matched with assistant profile 308C, and user profile 304D is matched with assistant profile 308B.

Figure 4:
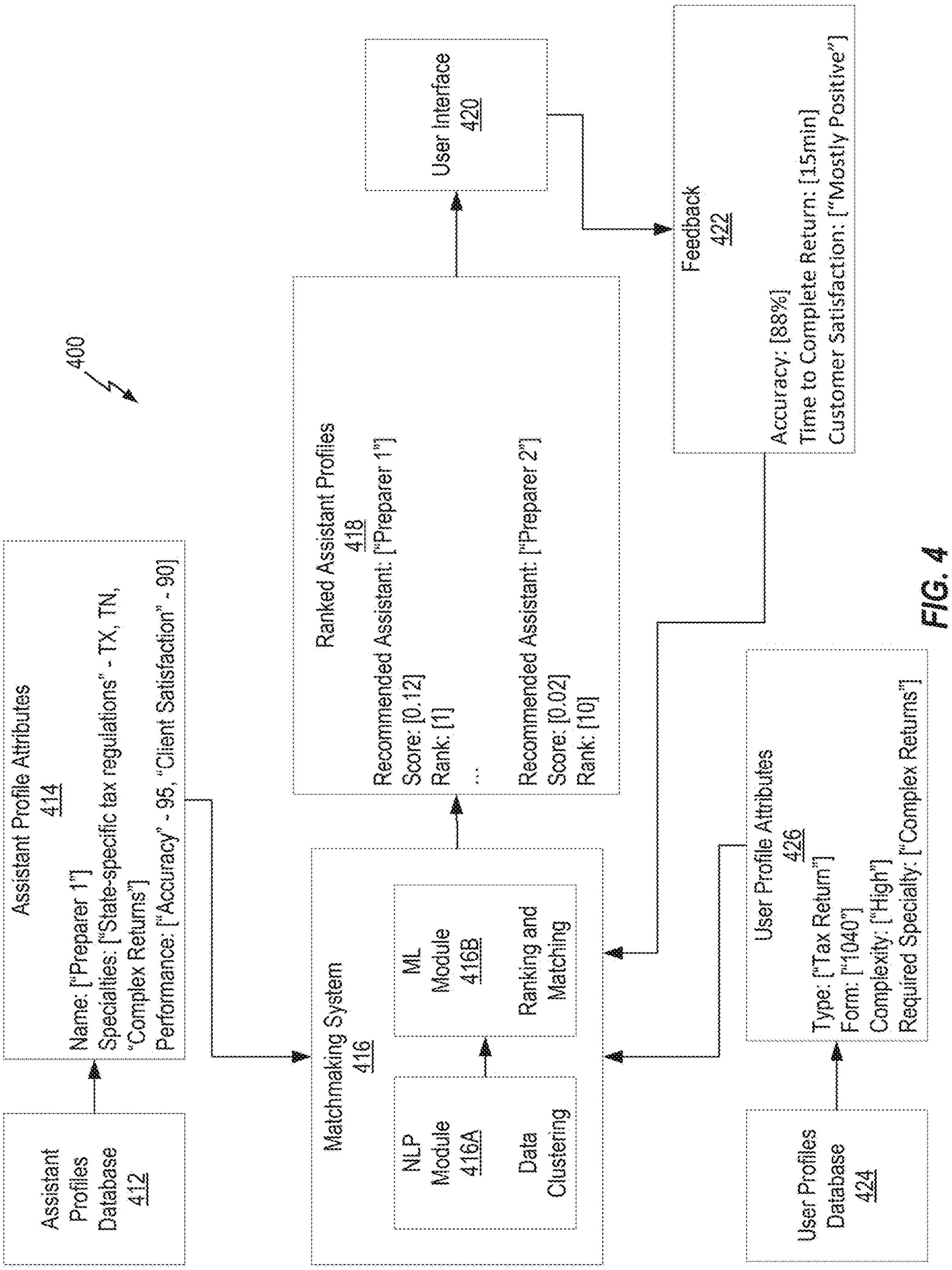
FIG. 4 depicts a process flow diagram for clustering and matching assistant profiles and user profiles based on assistant and user profile attributes.

FIG. 4 depicts a process flow diagram for clustering and matching assistant profiles and user profiles based on assistant and user profile attributes. Flow diagram 400 includes a matchmaking system 416, an assistant profiles database 412, a task database, and a user interface 420. In some aspects, matchmaking system 416 is comparable to matchmaking system 310 of FIG. 3, assistant profiles database 412 includes assistant profiles 208 of FIG. 2, and user profiles database includes user profiles 202 of FIG. 2.

Assistant profiles include assistant profile attributes, such as a name, expertise in one or more specialties, and one or more performance metrics. In some aspects, expertise attributes include state-specific tax regulations, such as "NY" or "TX", federal tax regulations, and/or complex returns. Complex returns may refer to tax returns that include both state and federal tax filings, multiple state filings, personal and corporation tax filings, and/or a combination thereof. Some examples of performance metrics include accuracy and client satisfaction. In some aspects, accuracy indicates a percentage of filings that were accurate, and client satisfaction indicates a percentage of filings of which the client was satisfied. For example, assistant profile attributes 414 are included in an assistant profile, such as assistant profile 308C of FIG. 3, including Name: "Preparer 1", Specialties: "State-specific regulations—TX, TN" and "Complex Returns", a performance metric for accuracy of "95" and a performance metric for client satisfaction of "90". In some aspects, an assistant profile may also include attributes indicating past tasks, and/or past users that have been matched with the assistant profile.

User profiles, such as those included in user profiles database 424, include user profile attributes, such as type of task, form, complexity level, and required specialty. For example, user profile attributes 426 may be associated with user profile 304A, including type: "Tax Return", form: "1040", complexity: "High", and required specialty: "Complex Returns." In this example, the complexity is "High", and the required specialty is "Complex Returns" because user profile 304A includes attributes for a state ("NY") filing and federal filing. A combination of state and federal filings is one example of a "Complex Return."

In some aspects, a user profile may be associated with one or more tasks (e.g., one or more tax returns). In such aspects, matchmaking system 416 may also include a task database, wherein each task is represented by a task profile. In some aspects, the task profile includes attributes such as task type, complexity level, specific qualifications required for task completion, and other task attributes. In the example of tax returns, the task profile may be a tax return profile, including the type of tax return, the form associated with the tax return, whether the tax return is a state or federal filing, a complexity level, or other tax return attributes. In some aspects, a user profile may also include attributes indicating past tasks, and/or past assistants that have been matched with the user profile.

As shown in FIG. 4, matchmaking system 416 includes natural language processing (NLP) module 416A and machine learning (ML) module 416B. In some aspects, NLP module 416A is configured to perform data clustering, such as generating user profile clusters and assistant profile clusters depicted in FIG. 3. NLP enables the conversion of unstructured or structured text into numerical representations that can be further processed. NLP can also be used to interpret and classify the key requirements from various tax return tasks and the specializations from the assistant profiles. Thus, text-based documents and files can be transformed into vector representations that capture semantic meaning. Similar documents and files can then be clustered together based on the similarity of vector representations. There are several clustering techniques that may be used to cluster user profiles and assistant profiles, such as term frequency-based techniques, topic modeling, and embedding-based clustering.

Term frequency-based techniques convert documents to vectors based on word frequencies, apply clustering algorithms, such as K-means or hierarchical clustering, and group similar profiles together based on vocabulary or attribute usage. Topic modeling techniques, such as Latent Dirichlet Allocation (LDA), can be used to discover abstract topics within profiles, wherein profiles can be clustered based on their topic distributions. Embedding-based clustering uses word or document embeddings, such as Word2Vec, GloVe, or BERT, to capture semantic relationships between words and profiles. This allows for clustering of profiles based on meaning rather than exact word or attribute matches.

Such techniques, or other clustering techniques, may be used by the NLP module 416A to generate one or more user profile clusters, such as user cluster 302A and user cluster 302B of FIG. 3, and one or more assistant clusters, such as assistant cluster 306A and assistant cluster 306B of FIG. 3.

In some aspects, ML module 416B is configured to perform ranking and matching of user profiles and assistant profiles. In particular, matchmaking system 416 identifies a target user profile (e.g., a target user profile associated with the user profile attributes 426) and generates a ranking of one or more assistant profiles based on how well matched the assistant profile is to the target user profile. In some aspects, matchmaking system 416 first identifies a target assistant cluster, and compares the target user profile with one or more assistant profiles included in the target assistant cluster. Each potential assistant-user pair is analyzed and scored based on compatibility through similarity scoring and classification techniques. Based on comparing the target user profile with the assistant profiles in the target assistant cluster, matchmaking system 416 is configured to generate ranked assistant profiles 418 including one or more assistant-user pairs.

Ranked assistant profiles 418 include one or more assistant profiles that are ranked based on how well the respective assistant profile matches the target user profile. As shown in FIG. 4, ranked assistant profiles 418 includes a first recommended assistant (e.g., "Preparer 1") that received a matching score of [0.12] and a first ranking (e.g., Rank: [1]). Ranked assistant profiles 418 includes one or more additional recommended assistants, up through, for example, a tenth ranking position. For example, "Preparer 2" is a recommended assistant with a matching score of [0.02] and a tenth ranking (e.g., Rank: [10]). In some aspects, the matching score represents a predicted success rate of a match between an assistant profile and a target user profile based on historical data, performance metrics, and attributes of the assistant profile and the target user profile.

The ranked assistant profiles 418 are then transmitted to and displayed at user interface 420 to be reviewed by a user corresponding to the target user profile. In some aspects, a top k (where k is a non-negative, non-zero integer) number of assistant profiles of ranked assistant profiles 418 are displayed at user interface 420. In some aspects, the most compatible assistant profile is recommended for the target user profile. The most compatible assistant profile is the assistant profile whose corresponding assistant has the most matching attributes to the target user profile.

In some aspects, the assistant profiles are ranked based on an availability of the assistant to perform the task requested by the target user. For example, some assistant profiles may not be active or may already be matched with another user of the user-application service. In another example, an assistant corresponding to an assistant profile may not be able to complete a task within a timeframe or deadline indicated by the task and/or user. Thus, in certain aspects where an assistant is not available to complete a task, the corresponding assistant profile will be ranked lower and/or removed from the ranking of assistant profiles for the target user.

The user may then confirm at least one of the recommended assistants, wherein the task associated with the target user profile (e.g., "Tax Return") is transmitted to the recommended assistant. In some aspects, the user declines one or more of the recommended assistants. The system is configured to receive a completed task from the assistant and provide the completed task to the user corresponding to the target user profile. At this stage, the user has the opportunity to review the completed task (e.g., the filed tax return documents) and provide user input to the system.

In some aspects, the user input includes feedback, such as feedback 422, from the user about the completed task. As shown in FIG. 4, in some instances, feedback 422 includes both system feedback, such as an accuracy score (e.g., 88%) and the time it took to complete the task (e.g., 15 minutes), as well as user feedback, such as customer satisfaction score. In some aspects, the customer satisfaction score is a binary score, indicating whether the customer was satisfied or not satisfied. In some aspects, the customer satisfaction score is based on a customer satisfaction score scale, such as negative, mostly negative, somewhat negative, neutral, somewhat positive, mostly positive, and positive, or a numerical scale, such as 1-10, with 1 being unsatisfied and 10 being satisfied with the assistant's performance on the task.

In some aspects, feedback 422 is used to update one or more assistant attributes associated with the target assistant profile. For example, based on feedback 422, the target user profile may be updated to reflect a new accuracy score or a new client satisfaction score. In some aspects, the matchmaking system 416 determines that a new client satisfaction score for the target assistant profile does not meet a minimum client satisfaction score, wherein the matchmaking system 416 will downgrade the likelihood of a new user being matched to the target assistant profile. In some aspects, if the matchmaking system 416 determines that an assistant profile has a client satisfaction score that does not meet a minimum client satisfaction score, the matchmaking system 416 will remove that assistant profile from the assistant profiles database 412.

In addition to being used to update one or more assistant profiles, feedback 422 may also be used to update the NLP module 416A and/or ML module 416B in order to improve the data clustering, ranking, and matching techniques employed by the matchmaking system 416. For example, the matchmaking system 416 uses the collected data from feedback 422 to adjust and refine the NLP module 416A and the ML module 416B to improve the accuracy and effectiveness of the clustering, ranking, and matching results.

Example Method for Matching Entities

Figure 5:
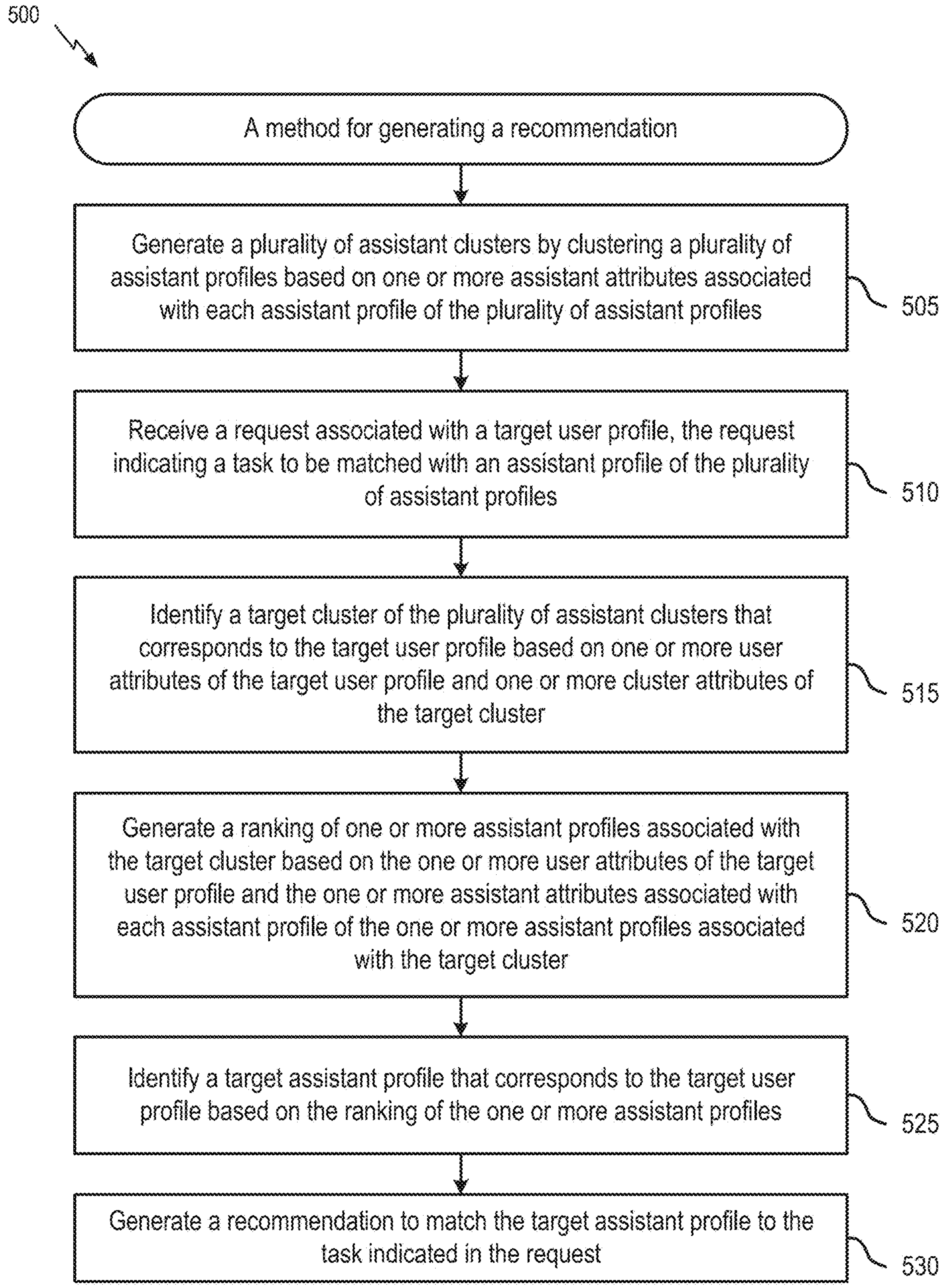
FIG. 5 depicts a method for matching assistant profiles and user profiles.

FIG. 5 depicts an example method 500 for generating a recommendation. In one aspect, method 500 can be implemented by the processing system 600 of FIG. 6.

Figure 6:
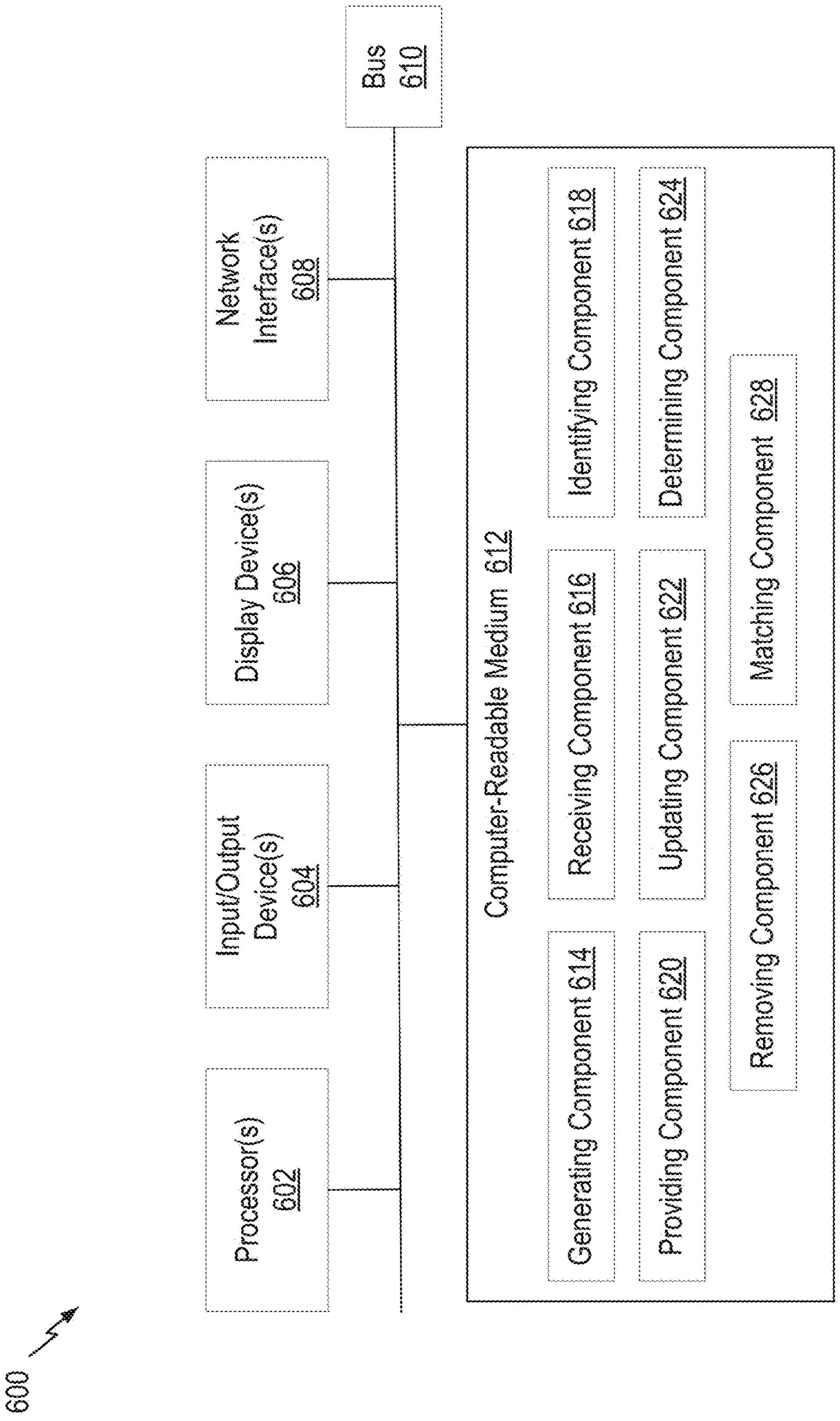
FIG. 6 depicts an example processing system with which aspects of the present disclosure can be performed.

Method 500 begins at block 505 with generating a plurality of assistant clusters by clustering a plurality of assistant profiles based on one or more assistant attributes associated with each assistant profile of the plurality of assistant profiles. In some aspects, generating component 614 of FIG. 6 is configured to generate a plurality of assistant clusters, such as assistant cluster 306A of FIG. 4 and/or assistant cluster 306B of FIG. 3, by clustering a plurality of assistant profiles, such as assistant profile 308A, assistant profile 308B, and assistant profile 308C. In some aspects, the assistant profiles are clustered based on one or more assistant attributes, such as "Federal", "TX", "SC", and/or "TN" as illustrated in FIG. 3 and/or other assistant profile attributes 414 of FIG. 4, associated with each assistant profile.

Method 500 then proceeds to block 510 with receiving a request associated with a target user profile, the request indicating a task to be matched with an assistant profile of the plurality of assistant profiles. In some aspects, receiving component 616 of FIG. 6 is configured to receive a request associated with a target user profile, such as user profile 304A of FIG. 3, the request indicating a task to be matched with an assistant profile, such as assistant profile 308A of FIG. 3.

Method 500 then proceeds to block 515 with identifying a target cluster of the plurality of assistant clusters that corresponds to the target user profile based on one or more user attributes of the target user profile and one or more cluster attributes of the target cluster. In some aspects, identifying component 618 of FIG. 6 is configured to identify a target cluster, such as assistant cluster 306A, based on one or more user attributes, such as "NY" or "Federal" of the target user profile (e.g., user profile 304A) and one or more cluster attributes, such as "Federal," of the target cluster.

Method 500 then proceeds to block 520 with generating a ranking of one or more assistant profiles associated with the target cluster based on the one or more user attributes of the target user profile and the one or more assistant attributes associated with each assistant profile of the one or more assistant profiles associated with the target cluster. In some aspects, generating component 614 of FIG. 6 is configured to generate a ranking of one or more assistant profiles, such as ranked assistant profiles 418 of FIG. 4.

Method 500 then proceeds to block 525 with identifying a target assistant profile that corresponds to the target user profile based on the ranking of the one or more assistant profiles. In some aspects, identifying component 618 of FIG. 6 is configured to identify a target assistant profile, such as assistant profile 308A of FIG. 3, that corresponds to the target user profile, such as user profile 304A of FIG. 3, based on the ranking of the one or more assistant profiles.

Method 500 then proceeds to block 530 with generating a recommendation to match the target assistant profile to the task indicated in the request. In some aspects, generating component 614 of FIG. 6 is configured to generate a recommendation to match the target assistant profile to the task, such as the task associated with user profile attributes 426 of FIG. 4, indicated in the request.

In some aspects, method 500 further includes receiving a plurality of requests associated with a plurality of user profiles, wherein each request of the plurality of requests includes instructions to match each user profile of the plurality of user profiles with at least one assistant profile of the plurality of assistant profiles.

In some aspects, method 500 further includes generating a plurality of user clusters by clustering the plurality of user profiles based on one or more user attributes associated with each user profile of the plurality of user profiles. In some aspects, generating component 614 of FIG. 6 generates user cluster 302A of FIG. 3 and user cluster 302B of FIG. 3.

In some aspects, method 500 further includes generating one or more cluster pairs, wherein each cluster pair of the one or more cluster pairs comprises at least one user cluster and at least one assistant cluster that corresponds to the at least one user cluster, wherein the at least one user cluster comprises a set of user profiles of the plurality of user profiles and the at least one assistant cluster comprises a set of assistant profiles of the plurality of assistant profiles.

In some aspects, method 500 further includes generating, for each respective user profile associated with a target cluster pair of the one or more cluster pairs, a ranking of one or more assistant profiles associated with the target cluster pair based on the one or more user attributes of each respective user profile associated with the target cluster pair and the one or more assistant attributes associated with each assistant profile of the one or more assistant profiles associated with the target cluster pair, wherein the target user profile is associated with the target cluster pair. In some aspects, generating component 614 of FIG. 6 generates ranked assistant profiles 418 of FIG. 4.

In some aspects, method 500 further includes generating one or more user-assistant pairs based on the ranking of the one or more assistant profiles associated with the target cluster pair for each respective user profile associated with the target cluster pair.

In some aspects, method 500 further includes receiving a completed task from a target assistant associated with the target assistant profile. In some aspects, method 500 further includes providing the completed task to a user associated with the target user profile.

In some aspects, method 500 further includes receiving user input comprising feedback about the completed task. In some aspects, receiving component 616 of FIG. 6 is configured to receive feedback 422 (e.g., user feedback) of FIG. 4 about the completed task.

In some aspects, method 500 further includes updating one or more assistant attributes associated with the target assistant profile based on the user input. In some aspects, updating component 622 of FIG. 6 is configured to update one or more assistant attributes associated with the target assistant profile based on the user input (e.g., feedback 422 of FIG. 4).

In some aspects, method 500 further includes determining that a client satisfaction score associated with the target assistant profile does not meet a minimum client satisfaction score. In some aspects, determining component 624 of FIG. 6 determines that a client satisfaction score of "90" in assistant profile attributes 414 does not meet the minimum client satisfaction score (e.g., "95").

In some aspects, method 500 further includes removing the target assistant profile from the plurality of assistant profiles. In some aspects, removing component 626 of FIG. 6 is configured to remove the target assistant profile from the assistant profiles database 412 and/or the ranked assistant profiles 418 of FIG. 4.

In some aspects, updating one or more assistant attributes associated with the target assistant profile based on the user input comprises updating one or more performance metrics of the one or more assistant attributes, the one or more performance metrics including an accuracy score, a client satisfaction score, and task completion time score. In some aspects, updating component 618 of FIG. 6 is configured to update one or more assistant profile attributes, such as assistant profile attributes 414. In some aspects, the one or more user attributes includes: a task type, a form name, a complexity rating, and one or more required specialties.

In some aspects, identifying the target assistant profile that corresponds to the target user profile based on the ranking of the one or more assistant profiles is further based on an availability of an assistant associated with each of the one or more assistant profiles to assist in completing the task within a certain timeframe.

In some aspects, method 500 further includes providing the recommendation to match the target assistant profile to the task indicated in the request to a user associated with the target user profile. In some aspects, providing component 620 of FIG. 6 provides the recommendation to the user via user interface 420 of FIG. 4.

In some aspects, method 500 further includes receiving user input confirming the recommendation to match the target assistant profile to the task indicated in the request. In some aspects, receiving component 616 of FIG. 6 receives user input at user interface 420 of FIG. 4.

In some aspects, method 500 further includes matching the target assistant profile to the task indicated in the request.

In some aspects, method 500 further includes receiving user input declining the recommendation to match the target assistant profile to the task indicated in the request. In some aspects, receiving component 616 of FIG. 6 receives user input at user interface 420 of FIG. 4.

In some aspects, method 500 further includes generating a second recommendation to match a different assistant profile to the task indicated in the request.

In some aspects, method 500 includes: providing the target user profile and each assistant profile of the one or more assistant profiles associated with the target cluster to a machine learning model configured to perform matching and ranking of user profiles and assistant profiles; and receiving, from the machine learning model, the ranking of one or more assistant profiles associated with the target cluster.

Accordingly, various aspects of method 500 improve upon the state-of-the-art for entity matching methods and achieve technical solutions to technical problems associated with existing entity matching methods. In particular, aspects of method 500 are able to improve assistant recommendations over time and adapt to dynamically changing attributes of the users and assistants based on the feedback loop implemented to update the clustering, ranking, and matching algorithms, as well as assistant and user profiles. In this manner, the entity matching systems are able to stay up-to-date with the capabilities of assistants and preferences of users. As another technical solution, aspects of method 500 overcome the problem of degraded user matches with increasing entity features because the entity matching systems are able to analyze many different attributes associated with the user profiles and target assistant profiles.

As another example of technical benefits, aspects of method 500 described herein also help mitigate and solve the problem associated with resource utilization by first clustering the user profiles and assistant profiles. By identifying a target assistant cluster, aspects of method 500 are able to narrow down the number of matches that will be analyzed to the number of assistants in the target assistant cluster. This saves on computational resources, such as compute and memory. By performing the entity matching in the manner and reducing the number of assistant profiles to analyze, aspects of method 500 also beneficially reduce latency in response times for providing recommendations to users, thereby overcoming technical problems associated with computationally expensive matching algorithms like graph-based matching algorithms.

Note that FIG. 5 is just one example of a method, and other methods including fewer, additional, or alternative operations are possible consistent with this disclosure.

Example Processing System for Matching Entities

FIG. 6 depicts an example processing system 600 configured to perform various aspects described herein, including, for example, method 500 as described above with respect to FIG. 5.

Processing system 600 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 600 includes one or more processor(s) 602, one or more input/output device(s) 604, one or more display device(s) 606, one or more network interface(s) 608 through which processing system 600 is connected to one or more network(s) (e.g., a local network, an intranet, the Internet, or any other group of processing systems communicatively connected to each other), and computer-readable medium 612. In the depicted example, the aforementioned components are coupled by a bus 610, which may generally be configured for data exchange amongst the components. Bus 610 may be representative of multiple buses, while only one is depicted for simplicity.

Processor(s) 602 are generally configured to retrieve and execute instructions stored in one or more memories, including local memories like computer-readable medium 612, as well as remote memories and data stores. Similarly, processor(s) 602 are configured to store application data residing in local memories like the computer-readable medium 612, as well as remote memories and data stores. More generally, bus 610 is configured to transmit programming instructions and application data among the processor(s) 602, display device(s) 606, network interface(s) 608, and/or computer-readable medium 612. In certain embodiments, processor(s) 602 are representative of one or more central processing units (CPUs), graphics processing units (GPUs), tensor processing units (TPUs), accelerators, and other processing devices.

Input/output device(s) 604 may include any device, mechanism, system, interactive display, and/or various other hardware and software components for communicating information between processing system 600 and a user of processing system 600. For example, input/output device(s) 604 may include input hardware, such as a keyboard, touch screen, button, microphone, speaker, and/or other device for receiving inputs from the user and sending outputs to the user.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices. In various embodiments, display device(s) 606 may be configured to display a graphical user interface.

Network interface(s) 608 provide processing system 600 with access to external networks and thereby to external processing systems. Network interface(s) 608 can generally be any hardware and/or software capable of transmitting and/or receiving data via a wired or wireless network connection. Accordingly, network interface(s) 608 can include a communication transceiver for sending and/or receiving any wired and/or wireless communication.

Computer-readable medium 612 may be a volatile memory, such as a random access memory (RAM), or a nonvolatile memory, such as nonvolatile random access memory (NVRAM), or the like. In this example, computer-readable medium 612 includes generating component 614, receiving component 616, identifying component 618, providing component 620, updating component 622, determining component 624, removing component 626, and matching component 628. Processing of the components 614-628 may enable and cause the processing system 600 to perform the method 500 described with respect to FIG. 5, or any aspect related to it.

In certain embodiments, generating component 614 is configured to generate a plurality of assistant clusters by clustering a plurality of assistant profiles based on one or more assistant attributes associated with each assistant profile of the plurality of assistant profiles, as described in FIG. 5 with reference to block 505. In certain embodiments, receiving component 616 is configured to receive a request associated with a target user profile, the request indicating a task to be matched with an assistant profile of the plurality of assistant profiles, as described in FIG. 5 with reference to block 510. In certain embodiments, identifying component 618 is configured to identify a target cluster of the plurality of assistant clusters that corresponds to the target user profile based on one or more user attributes of the target user profile and one or more cluster attributes of the target cluster, as described in FIG. 5 with reference to block 515. In certain embodiments, generating component 614 is configured to generate a ranking of one or more assistant profiles associated with the target cluster based on the one or more user attributes of the target user profile and the one or more assistant attributes associated with each assistant profile of the one or more assistant profiles associated with the target cluster, as described in FIG. 5 with reference to block 520. In certain embodiments, identifying component 618 is configured to identify a target assistant profile that corresponds to the target user profile based on the ranking of the one or more assistant profiles, as described in FIG. 5 with reference to block 525. In certain embodiments, generating component 614 is configured to generate a recommendation to match the target assistant profile to the task indicated in the request, as described in FIG. 5 with reference to block 530.

Note that FIG. 6 is just one example of a processing system consistent with aspects described herein, and other processing systems having additional, alternative, or fewer components are possible consistent with this disclosure.

Example Clauses

Implementation examples are described in the following numbered clauses:

Clause 1: A method, comprising: generating a plurality of assistant clusters by clustering a plurality of assistant profiles based on one or more assistant attributes associated with each assistant profile of the plurality of assistant profiles; receiving a request associated with a target user profile, the request indicating a task to be matched with an assistant profile of the plurality of assistant profiles; identifying a target cluster of the plurality of assistant clusters that corresponds to the target user profile based on one or more user attributes of the target user profile and one or more cluster attributes of the target cluster; generating a ranking of one or more assistant profiles associated with the target cluster based on the one or more user attributes of the target user profile and the one or more assistant attributes associated with each assistant profile of the one or more assistant profiles associated with the target cluster; identifying a target assistant profile that corresponds to the target user profile based on the ranking of the one or more assistant profiles; and generating a recommendation to match the target assistant profile to the task indicated in the request.

Clause 2: The method of Clause 1, further comprising: receiving a plurality of requests associated with a plurality of user profiles, wherein each request of the plurality of requests includes instructions to match each user profile of the plurality of user profiles with at least one assistant profile of the plurality of assistant profiles; generating a plurality of user clusters by clustering the plurality of user profiles based on one or more user attributes associated with each user profile of the plurality of user profiles; generating one or more cluster pairs, wherein each cluster pair of the one or more cluster pairs comprises at least one user cluster and at least one assistant cluster that corresponds to the at least one user cluster, wherein the at least one user cluster comprises a set of user profiles of the plurality of user profiles and the at least one assistant cluster comprises a set of assistant profiles of the plurality of assistant profiles; generating, for each respective user profile associated with a target cluster pair of the one or more cluster pairs, a ranking of one or more assistant profiles associated with the target cluster pair based on the one or more user attributes of each respective user profile associated with the target cluster pair and the one or more assistant attributes associated with each assistant profile of the one or more assistant profiles associated with the target cluster pair, wherein the target user profile is associated with the target cluster pair; and generating one or more user-assistant pairs based on the ranking of the one or more assistant profiles associated with the target cluster pair for each respective user profile associated with the target cluster pair.

Clause 3: The method of any one of Clauses 1-2, further comprising: receiving a completed task from a target assistant associated with the target assistant profile; providing the completed task to a user associated with the target user profile; receiving user input comprising feedback about the completed task; and updating one or more assistant attributes associated with the target assistant profile based on the user input.

Clause 4: The method of Clause 3, further comprising: determining that a client satisfaction score associated with the target assistant profile does not meet a minimum client satisfaction score; and removing the target assistant profile from the plurality of assistant profiles.

Clause 5: The method of Clause 3, wherein updating one or more assistant attributes associated with the target assistant profile based on the user input comprises updating one or more performance metrics of the one or more assistant attributes, the one or more performance metrics including an accuracy score, a client satisfaction score, and a task completion time score.

Clause 6: The method of any one of Clauses 1-5, wherein the one or more user attributes includes: a task type, a form name, a complexity rating, and one or more required specialties.

Clause 7: The method of any one of Clauses 1-6, wherein identifying the target assistant profile that corresponds to the target user profile based on the ranking of the one or more assistant profiles is further based on an availability of an assistant associated with each of the one or more assistant profiles to assist in completing the task within a certain timeframe.

Clause 8: The method of any one of Clauses 1-7, further comprising: providing the recommendation to match the target assistant profile to the task indicated in the request to a user associated with the target user profile; receiving user input confirming the recommendation to match the target assistant profile to the task indicated in the request; and matching the target assistant profile to the task indicated in the request.

Clause 9: The method of any one of Clauses 1-8, further comprising: providing the recommendation to match the target assistant profile to the task indicated in the request to a user associated with the target user profile; receiving user input declining the recommendation to match the target assistant profile to the task indicated in the request; and generating a second recommendation to match a different assistant profile to the task indicated in the request.

Clause 10: The method of any one of Clauses 1-9, wherein generating a ranking of one or more assistant profiles associated with the target cluster comprises: providing the target user profile and each assistant profile of the one or more assistant profiles associated with the target cluster to a machine learning model configured to perform matching and ranking of user profiles and assistant profiles; and receiving, from the machine learning model, the ranking of one or more assistant profiles associated with the target cluster.

Clause 11: A processing system, comprising: memory comprising computer-executable instructions; and one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium storing program code for causing a processing system to perform the steps of any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

generating a plurality of assistant clusters by clustering a plurality of assistant profiles based on one or more assistant attributes associated with each assistant profile of the plurality of assistant profiles;

receiving a request associated with a target user profile, the request indicating a task to be matched with an assistant profile of the plurality of assistant profiles;

identifying a target cluster of the plurality of assistant clusters that corresponds to the target user profile based on one or more user attributes of the target user profile and one or more cluster attributes of the target cluster;

generating a ranking of one or more assistant profiles associated with the target cluster based on the one or more user attributes of the target user profile and the one or more assistant attributes associated with each assistant profile of the one or more assistant profiles associated with the target cluster;

identifying a target assistant profile that corresponds to the target user profile based on the ranking of the one or more assistant profiles;

generating a recommendation to match the target assistant profile to the task indicated in the request;

receiving a completed task from a target assistant associated with the target assistant profile;

providing the completed task to a user associated with the target user profile;

receiving user input comprising feedback about the completed task; and updating one or more assistant attributes associated with the target assistant profile based on the user input;

wherein updating the one or more assistant attributes associated with the target assistant profile based on the user input comprises updating one or more performance metrics of the one or more assistant attributes associated with the target assistant profile, the one or more performance metrics including an accuracy score, a client satisfaction score, and a task completion time score.

2. The method of claim 1, further comprising:

receiving a plurality of requests associated with a plurality of user profiles, wherein each request of the plurality of requests includes instructions to match each user profile of the plurality of user profiles with at least one assistant profile of the plurality of assistant profiles;

generating a plurality of user clusters by clustering the plurality of user profiles based on one or more user attributes associated with each user profile of the plurality of user profiles;

generating one or more cluster pairs, wherein each cluster pair of the one or more cluster pairs comprises at least one user cluster and at least one assistant cluster that corresponds to the at least one user cluster, wherein the at least one user cluster comprises a set of user profiles of the plurality of user profiles and the at least one assistant cluster comprises a set of assistant profiles of the plurality of assistant profiles;

generating, for each respective user profile associated with a target cluster pair of the one or more cluster pairs, a ranking of one or more assistant profiles associated with the target cluster pair based on the one or more user attributes of each respective user profile associated with the target cluster pair and the one or more assistant attributes associated with each assistant profile of the one or more assistant profiles associated with the target cluster pair, wherein the target user profile is associated with the target cluster pair; and generating one or more assistant-user pairs based on the ranking of the one or more assistant profiles associated with the target cluster pair for each respective user profile associated with the target cluster pair.

3. The method of claim 1, further comprising:

determining that a client satisfaction score associated with the target assistant profile does not meet a minimum client satisfaction score; and removing the target assistant profile from the plurality of assistant profiles.

4. The method of claim 1, wherein the one or more user attribute include: a task type, a form name, a complexity rating, and one or more required specialties.

5. The method of claim 1, wherein identifying the target assistant profile that corresponds to the target user profile based on the ranking of the one or more assistant profiles is further based on an availability of an assistant associated with each of the one or more assistant profiles to assist in completing the task within a certain timeframe.

6. The method of claim 1, further comprising:

providing the recommendation to match the target assistant profile to the task indicated in the request to a user associated with the target user profile;

receiving another user input confirming the recommendation to match the target assistant profile to the task indicated in the request; and matching the target assistant profile to the task indicated in the request.

7. The method of claim 1, further comprising:

providing the recommendation to match the target assistant profile to the task indicated in the request to a user associated with the target user profile;

receiving another user input declining the recommendation to match the target assistant profile to the task indicated in the request; and generating a second recommendation to match a different assistant profile to the task indicated in the request.

8. The method of claim 1, wherein generating the ranking of the one or more assistant profiles associated with the target cluster comprises:

providing the target user profile and each assistant profile of the one or more assistant profiles associated with the target cluster to a machine learning model configured to perform matching and ranking of user profiles and assistant profiles; and receiving, from the machine learning model, the ranking of the one or more assistant profiles associated with the target cluster.

9. A processing system, comprising: memory comprising computer-executable instructions; and one or more processors configured to execute the computer-executable instructions and cause the processing system to:

generate a plurality of assistant clusters by clustering a plurality of assistant profiles based on one or more assistant attributes associated with each assistant profile of the plurality of assistant profiles;

receive a request associated with a target user profile, the request indicating a task to be matched with an assistant profile of the plurality of assistant profiles;

identify a target cluster of the plurality of assistant clusters that corresponds to the target user profile based on one or more user attributes of the target user profile and one or more cluster attributes of the target cluster;

generate a ranking of one or more assistant profiles associated with the target cluster based on the one or more user attributes of the target user profile and the one or more assistant attributes associated with each assistant profile of the one or more assistant profiles associated with the target cluster;

identify a target assistant profile that corresponds to the target user profile based on the ranking of the one or more assistant profiles;

generate a recommendation to match the target assistant profile to the task indicated in the request;

receive a completed task from a target assistant associated with the target assistant profile;

provide the completed task to a user associated with the target user profile;

receive user input comprising feedback about the completed task; and update one or more assistant attributes associated with the target assistant profile based on the user input, wherein to cause the processing system to update the one or more assistant attributes associated with the target assistant profile based on the user input, the one or more processors are configured to execute the computer-executable instructions and cause the processing system to update one or more performance metrics of the one or more assistant attributes associated with the target assistant profile, the one or more performance metrics including an accuracy score, a client satisfaction score, and task completion time score.

10. The processing system of claim 9, wherein the one or more processors are configured to execute the computer-executable instructions and cause the processing system to:

receive a plurality of requests associated with a plurality of user profiles, wherein each request of the plurality of requests includes instructions to match each user profile of the plurality of user profiles with at least one assistant profile of the plurality of assistant profiles;

generate a plurality of user clusters by clustering the plurality of user profiles based on one or more user attributes associated with each user profile of the plurality of user profiles;

generate one or more cluster pairs, wherein each cluster pair of the one or more cluster pairs comprises at least one user cluster and at least one assistant cluster that corresponds to the at least one user cluster, wherein the at least one user cluster comprises a set of user profiles of the plurality of user profiles and the at least one assistant cluster comprises a set of assistant profiles of the plurality of assistant profiles;

generate, for each respective user profile associated with a target cluster pair of the one or more cluster pairs, a ranking of one or more assistant profiles associated with the target cluster pair based on the one or more user attributes of each respective user profile associated with the target cluster pair and the one or more assistant attributes associated with each assistant profile of the one or more assistant profiles associated with the target cluster pair, wherein the target user profile is associated with the target cluster pair; and generate one or more assistant-user pairs based on the ranking of the one or more assistant profiles associated with the target cluster pair for each respective user profile associated with the target cluster pair.

11. The processing system of claim 9, wherein the one or more processors are configured to execute the computer-executable instructions and cause the processing system to:

determine that a client satisfaction score associated with the target assistant profile does not meet a minimum client satisfaction score; and remove the target assistant profile from the plurality of assistant profiles.

12. The processing system of claim 9, wherein the one or more user attributes include: a task type, a form name, a complexity rating, and one or more required specialties.

13. The processing system of claim 9, wherein identifying the target assistant profile that corresponds to the target user profile based on the ranking of the one or more assistant profiles is further based on an availability of an assistant associated with each of the one or more assistant profiles to assist in completing the task within a certain timeframe.

14. The processing system of claim 9, wherein the one or more processors are configured to execute the computer-executable instructions and cause the processing system to:

provide the recommendation to match the target assistant profile to the task indicated in the request to a user associated with the target user profile;

receive another user input confirming the recommendation to match the target assistant profile to the task indicated in the request; and match the target assistant profile to the task indicated in the request.

15. The processing system of claim 9, wherein the one or more processors are configured to execute the computer-executable instructions and cause the processing system to:

provide the recommendation to match the target assistant profile to the task indicated in the request to a user associated with the target user profile;

receive another user input declining the recommendation to match the target assistant profile to the task indicated in the request; and generate a second recommendation to match a different assistant profile to the task indicated in the request.

16. The processing system of claim 9, wherein to cause the processing system to generate the ranking of the one or more assistant profiles associated with the target cluster, the one or more processors are configured to execute the computer-executable instructions and cause the processing system to:

provide the target user profile and each assistant profile of the one or more assistant profiles associated with the target cluster to a machine learning model configured to perform matching and ranking of user profiles and assistant profiles; and receive, from the machine learning model, the ranking of the one or more assistant profiles associated with the target cluster.

17. A method, comprising:

generating a plurality of assistant clusters by clustering a plurality of assistant profiles based on one or more assistant attributes associated with each assistant profile of the plurality of assistant profiles;

receiving a request associated with a target user profile, the request indicating a task to be matched with an assistant profile of the plurality of assistant profiles;

identifying a target cluster of the plurality of assistant clusters that corresponds to the target user profile based on one or more user attributes of the target user profile and one or more cluster attributes of the target cluster;

generating a ranking of one or more assistant profiles associated with the target cluster based on the one or more user attributes of the target user profile and the one or more assistant attributes associated with each assistant profile of the one or more assistant profiles associated with the target cluster;

identifying a target assistant profile that corresponds to the target user profile based on the ranking of the one or more assistant profiles;

generating a recommendation to match the target assistant profile to the task indicated in the request;

receiving a completed task from a target assistant associated with the target assistant profile;

providing the completed task to a user associated with the target user profile;

receiving user input comprising feedback about the completed task;

updating one or more assistant attributes associated with the target assistant profile based on the user input;

determining that a client satisfaction score associated with the target assistant profile does not meet a minimum client satisfaction score; and removing the target assistant profile from the plurality of assistant profiles.

18. The method of claim 17, further comprising:

receiving a plurality of requests associated with a plurality of user profiles, wherein each request of the plurality of requests includes instructions to match each user profile of the plurality of user profiles with at least one assistant profile of the plurality of assistant profiles;

generating a plurality of user clusters by clustering the plurality of user profiles based on one or more user attributes associated with each user profile of the plurality of user profiles;

generating one or more cluster pairs, wherein each cluster pair of the one or more cluster pairs comprises at least one user cluster and at least one assistant cluster that corresponds to the at least one user cluster, wherein the at least one user cluster comprises a set of user profiles of the plurality of user profiles and the at least one assistant cluster comprises a set of assistant profiles of the plurality of assistant profiles;

generating, for each respective user profile associated with a target cluster pair of the one or more cluster pairs, a ranking of one or more assistant profiles associated with the target cluster pair based on the one or more user attributes of each respective user profile associated with the target cluster pair and the one or more assistant attributes associated with each assistant profile of the one or more assistant profiles associated with the target cluster pair, wherein the target user profile is associated with the target cluster pair; and generating one or more assistant-user pairs based on the ranking of the one or more assistant profiles associated with the target cluster pair for each respective user profile associated with the target cluster pair.

19. The method of claim 17, wherein identifying the target assistant profile that corresponds to the target user profile based on the ranking of the one or more assistant profiles is further based on an availability of an assistant associated with each of the one or more assistant profiles to assist in completing the task within a certain timeframe.

20. The method of claim 17, wherein generating the ranking of the one or more assistant profiles associated with the target cluster comprises:

providing the target user profile and each assistant profile of the one or more assistant profiles associated with the target cluster to a machine learning model configured to perform matching and ranking of user profiles and assistant profiles; and receiving, from the machine learning model, the ranking of the one or more assistant profiles associated with the target cluster.

21. A processing system, comprising: memory comprising computer-executable instructions; and one or more processors configured to execute the computer-executable instructions and cause the processing system to:

generate a plurality of assistant clusters by clustering a plurality of assistant profiles based on one or more assistant attributes associated with each assistant profile of the plurality of assistant profiles;

receive a request associated with a target user profile, the request indicating a task to be matched with an assistant profile of the plurality of assistant profiles;

identify a target cluster of the plurality of assistant clusters that corresponds to the target user profile based on one or more user attributes of the target user profile and one or more cluster attributes of the target cluster;

generate a ranking of one or more assistant profiles associated with the target cluster based on the one or more user attributes of the target user profile and the one or more assistant attributes associated with each assistant profile of the one or more assistant profiles associated with the target cluster;

identify a target assistant profile that corresponds to the target user profile based on the ranking of the one or more assistant profiles;

generate a recommendation to match the target assistant profile to the task indicated in the request;

receive a completed task from a target assistant associated with the target assistant profile;

provide the completed task to a user associated with the target user profile;

receive user input comprising feedback about the completed task;

update one or more assistant attributes associated with the target assistant profile based on the user input;

determine that a client satisfaction score associated with the target assistant profile does not meet a minimum client satisfaction score; and remove the target assistant profile from the plurality of assistant profiles.

22. The processing system of claim 21, wherein the one or more processors are configured to execute the computer-executable instructions and cause the processing system to:

receive a plurality of requests associated with a plurality of user profiles, wherein each request of the plurality of requests includes instructions to match each user profile of the plurality of user profiles with at least one assistant profile of the plurality of assistant profiles;

generate a plurality of user clusters by clustering the plurality of user profiles based on one or more user attributes associated with each user profile of the plurality of user profiles;

generate one or more cluster pairs, wherein each cluster pair of the one or more cluster pairs comprises at least one user cluster and at least one assistant cluster that corresponds to the at least one user cluster, wherein the at least one user cluster comprises a set of user profiles of the plurality of user profiles and the at least one assistant cluster comprises a set of assistant profiles of the plurality of assistant profiles;

generate, for each respective user profile associated with a target cluster pair of the one or more cluster pairs, a ranking of one or more assistant profiles associated with the target cluster pair based on the one or more user attributes of each respective user profile associated with the target cluster pair and the one or more assistant attributes associated with each assistant profile of the one or more assistant profiles associated with the target cluster pair, wherein the target user profile is associated with the target cluster pair; and generate one or more assistant-user pairs based on the ranking of the one or more assistant profiles associated with the target cluster pair for each respective user profile associated with the target cluster pair.

23. The processing system of claim 21, wherein identifying the target assistant profile that corresponds to the target user profile based on the ranking of the one or more assistant profiles is further based on an availability of an assistant associated with each of the one or more assistant profiles to assist in completing the task within a certain timeframe.

24. The processing system of claim 21, wherein to cause the processing system to generate the ranking of the one or more assistant profiles associated with the target cluster, the one or more processors are configured to execute the computer-executable instructions and cause the processing system to:

provide the target user profile and each assistant profile of the one or more assistant profiles associated with the target cluster to a machine learning model configured to perform matching and ranking of user profiles and assistant profiles; and receive, from the machine learning model, the ranking of the one or more assistant profiles associated with the target cluster.

* * * * *